United States Patent
Ye

(10) Patent No.: US 8,363,119 B2
(45) Date of Patent: Jan. 29, 2013

(54) SYSTEM AND METHOD FOR CONTROLLING AN IMAGE COLLECTING DEVICE TO CARRY OUT A TARGET LOCATION

(75) Inventor: Maolin Ye, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 520 days.

(21) Appl. No.: 12/581,615

(22) Filed: Oct. 19, 2009

(65) Prior Publication Data

US 2010/0033585 A1 Feb. 11, 2010

Related U.S. Application Data

(63) Continuation-in-part of application No. PCT/CN2008/070782, filed on Apr. 23, 2008.

(30) Foreign Application Priority Data

May 10, 2007 (CN) .......................... 2007 1 0104372

(51) Int. Cl.
*H04N 5/232* (2006.01)
*G10L 17/00* (2006.01)

(52) U.S. Cl. ..................................... 348/211.4; 704/246
(58) Field of Classification Search .................. None
See application file for complete search history.

(56) References Cited

U.S. PATENT DOCUMENTS

| | | | |
|---|---|---|---|
| 5,686,957 A | | 11/1997 | Baker |
| 5,742,329 A * | | 4/1998 | Masunaga et al. ......... 348/14.07 |
| 5,778,082 A * | | 7/1998 | Chu et al. ........................ 381/92 |
| 5,957,667 A * | | 9/1999 | Epp ............................... 417/271 |
| 6,192,342 B1 | | 2/2001 | Akst |
| 6,593,956 B1 * | | 7/2003 | Potts et al. ................. 348/14.09 |
| 7,227,566 B2 | | 6/2007 | Abe et al. |
| 2006/0104454 A1 | | 5/2006 | Guitarte Perez et al. |

FOREIGN PATENT DOCUMENTS

| | | |
|---|---|---|
| CN | 1436436 A | 8/2003 |
| CN | 1620197 A | 5/2005 |
| CN | 1830009 A | 9/2006 |
| CN | 101068308 A | 11/2007 |
| JP | 1998-276417 A | 10/1998 |

(Continued)

OTHER PUBLICATIONS

Lin, Zhi-bin et al., "Sound Source Localization Based on Microphone Array," China Academic Journal Electronic Publishing House, pp. 19-23, 2004.

(Continued)

*Primary Examiner* — Luong T Nguyen
(74) *Attorney, Agent, or Firm* — Leydig, Voit & Mayer, Ltd.

(57) ABSTRACT

System and method for controlling an image collecting device to carry out a target location are provided, which includes: an acoustic sound source locating unit, configured to carry out target location based on a received acoustical signal and transmit the located position to an application layer strategy unit; a voice recognition unit, configured to carry out a recognition and matching process with a stored acoustical signal based on the received acoustical signal, and transmit the recognition result to the application layer strategy unit; and the application layer strategy unit, configured to decide an expected PTZ position of the image collecting device based on the position and the recognition result. The system controls the image collecting device to automatically carry out a target location based on the results of the acoustic sound source location and voice recognition, which thus improves an operating maintainability of the image collecting device.

10 Claims, 3 Drawing Sheets

FOREIGN PATENT DOCUMENTS

| | | |
|---|---|---|
| JP | 2000341658 A | 12/2000 |
| JP | 2002135642 A | 5/2002 |
| JP | 2005-142640 | 6/2005 |
| JP | 2007067972 A | 3/2007 |
| WO | WO 97/48252 A1 | 12/1997 |

OTHER PUBLICATIONS

First Chinese Office Action dated (mailed) May 30, 2008, issued in related Chinese Application No. 200710104372.9 Huawei Technologies Co., Ltd.

Second Chinese Office Action dated (mailed) Nov. 14, 2008, issued in related Chinese Application No. 200710104372.9 Huawei Technologies Co., Ltd.

Extended European Search Report dated (mailed) Jun. 8, 2010, issued in related Application No. 08734140.0-1241, PCT/CN2008070782, filed Apr. 23, 2008, Hauwei Technologies Co., Ltd.

Written Opinion of the International Searching Authority (translation) dated (mailed) Aug. 14, 2008, issued in related Application No. PCT/CN2008/070782, filed Apr. 23, 2008, Huawei Technologies Co., Ltd.

Rosenberg, et al., "SIP: Sessions Initiation Protocol," RFC 3261, The Internet Society, Jun. 2002.

Japanese Notice of Reasons for Rejection dated (mailed) Nov. 29, 2011, issued in Japanese Application No. 2010-500057.

ITU-T, TD 44 (PLEN) H.323 Series H. Audiovisual and Multimedia Systems Infrastructure of audiovisual services—Systems and terminal equipment for audiovisual services, May 2003.

Decision of Rejection mailed Jun. 26, 2012, issued in related Japanese Application No. 2010-500057, Huawei Technologies Co., Ltd. (2 pages).

Decision to Reject the Amendments mailed Jun. 26, 2012, issued in related Japanese Application No. 2010-500057, Huawei Technologies Co., Ltd. (9 pages).

Office Action in corresponding European Patent Application No. 08734140.0 (Nov. 8, 2012).

Ding Guixiang et al., "Key Issues and Applications of the Voiceprint Recognition Technologies," Jul. 2004, China Academic Journal Electronic Publishing House, pp. 43-45.

* cited by examiner

SYSTEM AND METHOD FOR CONTROLLING AN IMAGE COLLECTING DEVICE TO CARRY OUT A TARGET LOCATION

CROSS-REFERENCE TO RELATED APPLICATIONS

This application is a continuation-in-part of International Application No. PCT/CN2008/070782, filed Apr. 23, 2008, which claims priority to Chinese Patent Application No. 200710104372.9, filed May 10, 2007, both of which are hereby incorporated by reference in their entireties.

FIELD OF THE INVENTION

The present invention relates to the field of multimedia technology, and more particularly to a system and a method for controlling an image collecting device to carry out a target location.

BACKGROUND OF THE INVENTION

Nowadays, an acoustic sound source location technology has been widely adopted in video phone, telephone conference, and video conference systems to control a video camera to focus on the person who is speaking.

For example, in a conference with a plurality of individual participants, a video camera based on an acoustic sound source location technology can automatically focus on a person who is speaking, for example, a representative, a reporter, etc., based on the position of an acoustic sound source, but if another person makes a sound at the same time, the video camera may turn to the person who makes the sound, which results in an undesirable effect.

As another example, in a conference with a plurality of individual participants who can speak and discuss, generally, the video camera is expected to preferably focus on the expert who is participating in the discussion. However, the video camera based on the acoustic sound source location technology generally focuses on the participant who makes a sound with highest intensity, and if the voice of the expert is not higher than that of the others during the discussion, the video camera cannot focus on the expert.

In view of the above, the existing video camera based on acoustic sound source location cannot satisfy the requirements under various scenarios, and if various application scenarios need to be satisfied, the video camera is required to be remotely controlled manually, which is rather inconvenient in both operation and maintenance.

SUMMARY OF THE INVENTION

In view of the above problems in the prior art, various embodiments of the present invention provide a system and a method for controlling an image collecting device to carry out a target location, in which the image collecting device is controlled to automatically carry out a target location based on results of acoustic sound source location and voice recognition, thereby improving an operating maintainability of the image collecting device.

A system for controlling an image collecting device to carry out a target location includes an acoustic sound source locating unit, a voice recognition unit, and an application layer strategy unit.

The acoustic sound source locating unit is configured to carry out an acoustic sound source location based on a received acoustical signal, and locate an acoustic sound source position.

The voice recognition unit is configured to carry out recognition and matching process with a stored acoustical signal based on the received acoustical signal, and obtain a voice recognition result.

The application layer strategy unit is configured to decide an expected Pan-Tilt-Zoom (PTZ) position of the image collecting device based on the acoustic sound source position and the voice recognition result.

An embodiment of the present invention further provides a method for controlling an image collecting device to carry out a target location, which includes the following steps.

An acoustic sound source position is located based on a received acoustical signal.

A recognition and matching process is carried out with a stored acoustical signal based on the received acoustical signal, and a voice recognition result is obtained.

An expected PTZ position of the image collecting device is decided based on the acoustic sound source position and the voice recognition result.

As seen from the above technical solutions provided by the embodiments of the present invention, the embodiments of the present invention provide a system and a method for controlling an image collecting device to carry out a target location, in which the image collecting device is controlled to automatically carry out a target location based on the results of acoustic sound source location and voice recognition, thereby improving an operating maintainability of the image collecting device.

DETAILED DESCRIPTION OF THE EMBODIMENTS

A system for controlling an image collecting device to carry out a target location described in an embodiment of the present invention is illustrated below in detail with reference to FIG. 1 and FIG. 2.

Figure 1:
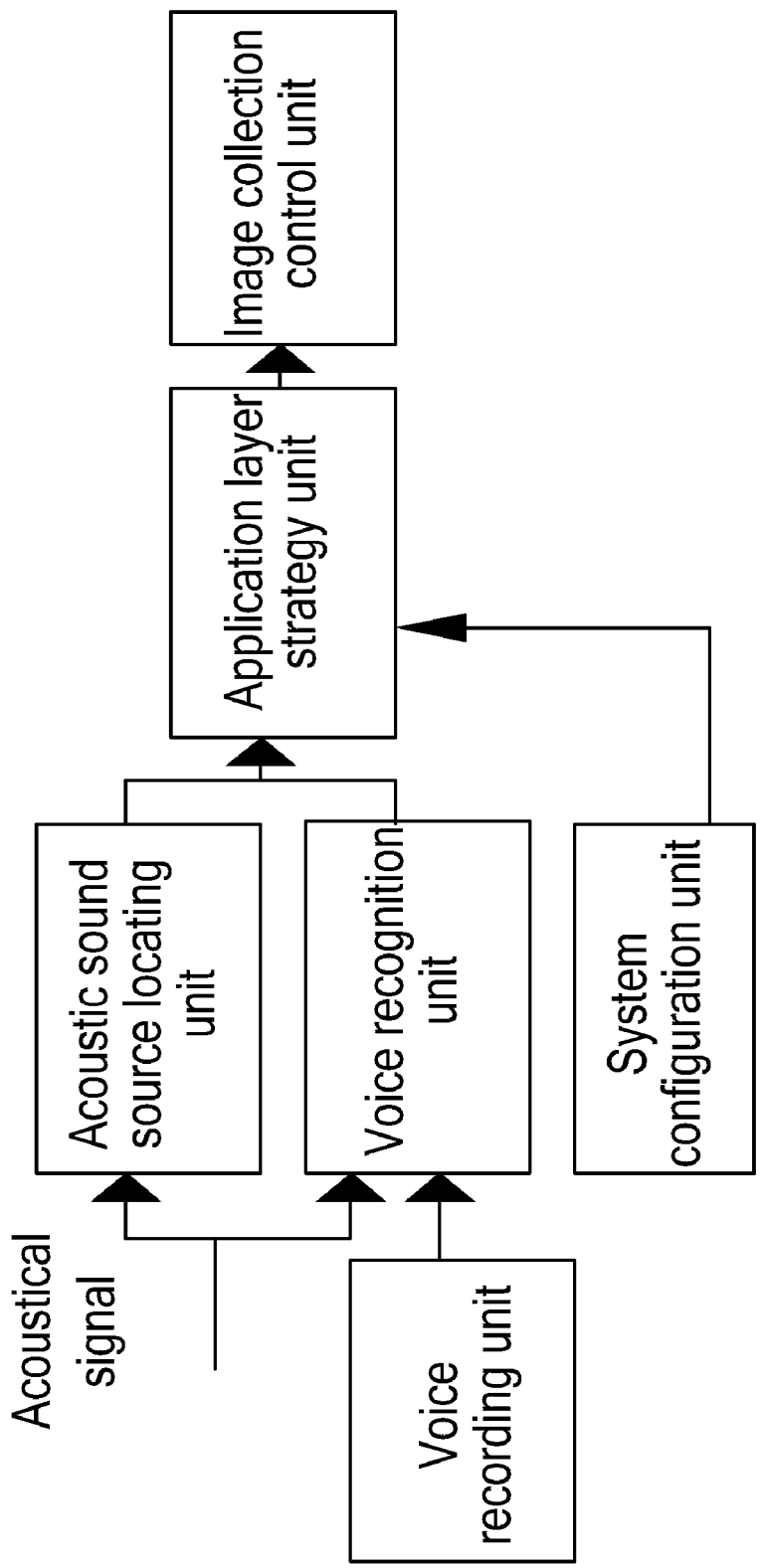
FIG. 1 is a simple schematic structural view of a system according to an embodiment of the present invention.

FIG. 1 is a schematic structural view of a system according to an embodiment of the present invention. Referring to FIG. 1, during specific implementations, the system in the embodiment of the present invention includes an acoustic sound source locating unit, a voice recognition unit, an application layer strategy unit, an image collection control unit (optional), and a system configuration unit (optional), which are respectively described below.

The acoustic sound source locating unit processes an acoustical signal received from the exterior, locates an acoustic sound source position, and transmits the acoustic sound source position to the application layer strategy unit. When a plurality of such acoustical signals exists, the acoustic sound source locating unit locates a plurality of acoustic sound source positions, and transmits the plurality of acoustic sound source positions to the application layer strategy unit. The specific acoustic sound source location process now has mature solutions, and is not described here any more.

The voice recognition unit carries out a recognition and matching process with a stored acoustical signal based on an acoustical signal received from the exterior, and transmits an obtained voice recognition result to the application layer strategy unit. The voice recognition result may include: it is matched with a pre-set voice, or it is not matched with the pre-set voice, or no matched pre-set voice is found, but an acoustic sound source with a high sound intensity is different from the previous one. When a plurality of stored acoustical signals exists, the voice recognition unit may generate a plurality of voice recognition results.

The application layer strategy unit carries out a decision based on the acoustic sound source position obtained from the acoustic sound source locating unit and the voice recognition result obtained from the voice recognition unit, so as to decide an expected PTZ position of the image collecting device, and then transmits the expected PTZ position of the image collecting device to the image collection control unit.

When a plurality of stored acoustical signals exists, the application layer strategy unit carries out a comprehensive decision based on a plurality of acoustic sound source positions, a plurality of voice recognition results as well as priorities of the voices to be recognized, obtains an expected PTZ position of the image collecting device, and transmits the expected PTZ position to the image collection control unit.

The image collection control unit compares the obtained expected PTZ position of the image collecting device with a current PTZ position of the image collecting device, and if they are the same, no operation is performed on the image collecting device; if they are different, corresponding operations are performed on the image collecting device, so as to change the position of the image collecting device to the expected PTZ position.

The system configuration unit analyzes system parameters based on requirements of different application scenarios. The system parameters may include: a parameter about manually or automatically remote controlling a video camera, a parameter about whether carrying out an acoustic sound source location, a parameter about whether carrying out a voice recognition, priorities of the stored acoustical signals, priorities of sound intensities, and so on. Then, the system configuration unit transmits the system parameters to the application layer strategy unit respectively. Particularly, for example, the system configuration unit transmits such system parameters about automatically remote controlling the video camera, carrying out the acoustic sound source location, carrying out the voice recognition to the application layer strategy unit, so that the application layer strategy unit can carry out a decision based on such system parameters and the acoustic sound source position as well as the voice recognition result, so as to decide the expected PTZ position of the image collecting device.

The system in the embodiment of the present invention further includes a voice recording unit.

The voice recording unit is configured to pre-record an acoustical signal to be recognized, and transmit the acoustical signal to be recognized to the voice recognition unit. One or more acoustical signals to be recognized may be pre-recorded, and in this case, the voice recording unit may record all the acoustical signals to be recognized, and transmit them to the voice recognition unit.

As seen from the above descriptions, the system in the embodiment of the present invention triggers the application layer strategy unit to carry out a decision through the acoustic sound source position located by the acoustic sound source locating unit and the voice recognition result obtained by the voice recognition unit, and then controls the image collecting device to automatically carry out a target location based on a compare result of the expected PTZ position of the image collecting device with the current PTZ position of the image collecting device, thereby improving the operating maintainability of the image collecting device.

Figure 2:
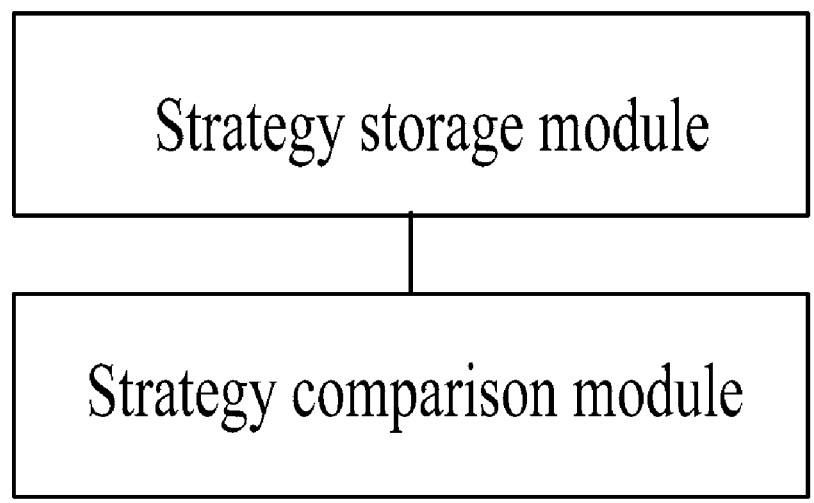
FIG. 2 is a simple schematic structural view of an image collection control unit in the system according to an embodiment of the present invention.

FIG. 2 is a schematic structural view of an image collection control unit in the system according to an embodiment of the present invention. Referring to FIG. 2, the image collection control unit includes a strategy storage module and a strategy comparison module.

The strategy storage module is configured to store a current PTZ position of an image collecting device.

The strategy comparison module is configured to compare an expected PTZ position of the image collecting device with the current PTZ position of the image collecting device, and control the image collecting device based on a compare result. Specifically, the strategy comparison module compares the obtained expected PTZ position of the image collecting device with the current PTZ position of the image collecting device, and if the compare result is that the two positions are the same, the position of the image collecting device is not changed; otherwise, the current PTZ position of the image collecting device is updated to the expected PTZ position of the image collecting device, and the image collecting device is controlled to carry out position displacement based on the expected PTZ position of the image collecting device.

A method according to an embodiment of the present invention is illustrated below in detail with reference to FIG. 3.

Figure 3:
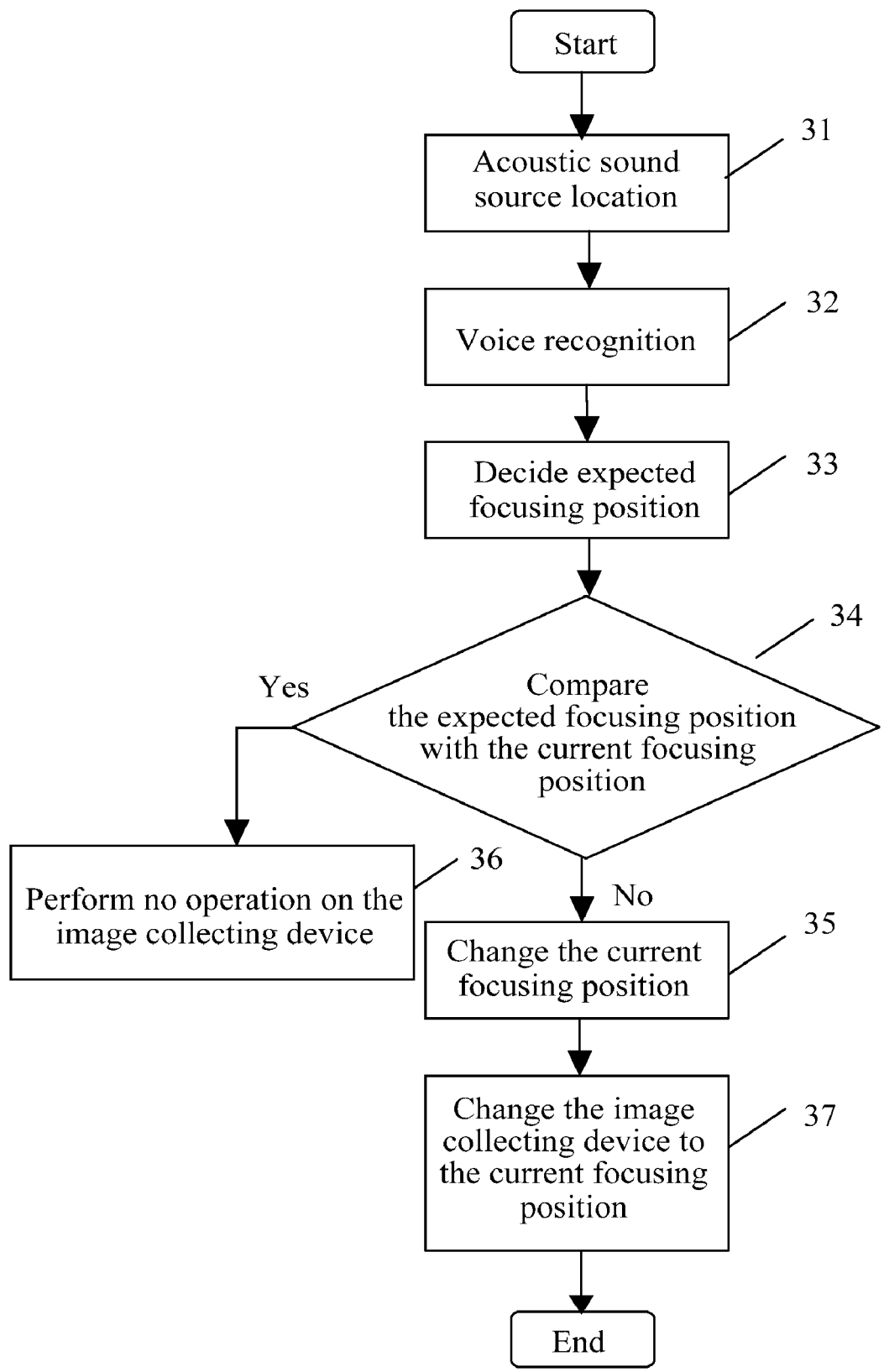
FIG. 3 is a flow chart of a method according to an embodiment of the present invention.

Referring to FIG. 3, the method in the embodiment of the present invention includes the following steps.

In Step 31, an acoustic sound source position is located based on a received acoustical signal.

In Step 32, a matching and recognition process is carried out with a pre-stored acoustical signal based on the received acoustical signal, so as to obtain a voice recognition result.

In Step 33, an expected PTZ position of an image collecting device is decided based on the acoustic sound source position and the voice recognition result. When a plurality of stored acoustical signals exists, the expected PTZ position of the image collecting device is further decided comprehensively based on the priorities of the stored acoustical signals.

In Step 34, the obtained expected PTZ position of the image collecting device is compared with a current PTZ position of the image collecting device, and if they are the same, Step 36 is executed, and otherwise, Step 35 is executed.

In Step 35, the current PTZ position of the image collecting device is changed to the expected PTZ position, and the flow proceeds to Step 37.

In Step 36, no operation is performed on the image collecting device.

In Step 37, operations are performed on the image collecting device based on the expected PTZ position of the image collecting device, so as to change the image collecting device to the expected PTZ position.

As seen from the above descriptions, the method in the embodiment of the present invention controls the image collecting device to automatically carry out a target location based on the results of acoustic sound source location and voice recognition, thereby improving an operating maintainability of the image collecting device.

Specific examples of applications of the system and the method in the embodiments of the present invention are illustrated below.

A application scenario where the embodiment of the present invention is applied is described below.

Before a conference, a strategy of automatically controlling a video camera based on acoustic sound source location technology and/or voice recognition technology is input to an application layer strategy unit through a system configuration unit, and meanwhile, the voices of representatives or reporters to be recognized are transmitted to a voice recognition unit through a voice recording unit. During the conference, the system automatically locates an acoustic sound source position and recognizes whether the voice of the acoustic sound source matches with a pre-stored voice or not, and if a new voice is matched, the video camera rotates to focus on a new acoustic sound source position; if a voice the same as the previous voice is matched or no stored voice is matched, no operation is performed on the video camera and the video camera does not rotate.

Another application scenario where the embodiment of the present invention is applied is described below.

Before a conference, a strategy of automatically controlling a video camera based on acoustic sound source location technology and/or voice recognition technology and a strategy that the voices of experts have the highest priority and the voices with high intensities have the second highest priority are input to an application layer strategy unit through a system configuration unit, and meanwhile, the voices of the experts to be recognized are recorded and stored into a voice recognition unit, and the priority levels of the voices of the experts and priority levels of the voices intensities are set. During the conference, the system automatically locates an acoustic sound source position and recognizes whether the voice of the acoustic sound source matches with a pre-stored voice or not, and if a new voice is matched, the video camera rotates to focus on a new acoustic sound source position; if no new voice is matched, but an acoustic sound source with a high sound intensity is different from the previous one, the video camera also rotates to focus on a new acoustic sound source position; otherwise, no operation is performed on the video camera and the video camera does not rotate. The applications of the system and the method in the embodiments of the present invention in other scenarios are quite similar, and are not described here any more.

In addition, the image collecting device in the embodiments of the present invention may be a video camera, and those skilled in the art shall know that, the embodiments of the present invention are also applicable to other image collecting devices, such as camera heads.

In addition, PTZ is an acronym for Pan, Tilt, and Zoom and the PTZ position is refer to the description of the camera movement. The first and second component of the PTZ position can be described by angle and the third component can be described by multiplicity. So updating the current PTZ position of the image collecting device to the expected PTZ position of the image collecting device can be realized by adjusting the angle of the first and second component of the PTZ position and adjusting the multiplicity of the third component of the PTZ position.

To sum up, the embodiments of the present invention provide a system and a method for controlling an image collecting device to carry out a target location, in which the image collecting device is controlled to automatically carry out the location based on the results of acoustic sound source location and voice recognition, thereby improving an operating maintainability of the image collecting device. In addition, the embodiments of the present invention can further configure corresponding system parameters for different scenarios through a system configuration unit, so as to meet the requirements of various different scenarios.

Through the above descriptions of the implementation manners, those skilled in the art can clearly understand that, some embodiments of the present invention may be realized through combining software with a necessary universal hardware platform, which definitely can be realized through hardware. Based on such understanding, the technical solutions of the present invention or parts of the technical solutions of the present invention making contributions to the prior art are substantially presented in the form of a software product. The computer software product is stored in a storage medium, which includes a plurality of instructions for enabling equipment with calculating and processing capabilities to execute the methods according to the embodiments of the present invention.

The above embodiments are merely preferred implementations of the present invention, but not to limit the protection scope of present invention. It will be apparent to those skilled in the art that various modifications and variations can be made to the structure of the present invention without departing from the scope of the invention. In view of the foregoing, it is intended that the present invention cover modifications and variations of this invention provided they fall within the scope of the following claims and their equivalents.

What is claimed is:

1. A system for controlling an image collecting device to locate a target, comprising:
   an acoustic sound source locating unit, configured to locate a plurality of acoustic sound source positions based on a plurality of received acoustical signals;
   a voice recognition unit, configured to compare the received acoustical signals with a plurality of stored acoustical signals to obtain a plurality of voice recognition results;
   a system configuration unit, configured to configure system parameters according to different application scenarios;
   an application layer strategy unit, configured to decide an expected Pan-Tilt-Zoom (PTZ) position of the image collecting device based on the acoustic sound source positions, the voice recognition results, and the system parameters; and
   an image collection control unit, configured to compare the expected PTZ position of the image collecting device with a current PTZ position of the image collecting device and to control the image collecting device based on a comparison result.

2. The system according to claim 1, wherein the system parameters comprise one or more parameters selected from a group consisting of a parameter for determining whether the image collecting device is controlled manually or automatically, a parameter for determining whether to carry out an acoustic sound source location, a parameter for determining whether to carry out a voice recognition, priorities of stored acoustical signals, and priorities of sound intensities.

3. The system according to claim 1, wherein the stored acoustical signals are acoustical signals from a plurality of acoustic sound sources.

4. The system according to claim 1, further comprising: a voice recording unit, configured to pre-record acoustical signals to be recognized to serve as the stored acoustical signals.

5. The system according to claim 2, further comprising: a voice recording unit, configured to pre-record acoustical signals to be recognized to serve as the stored acoustical signals.

6. The system according to claim 1, wherein the image collection control unit further comprises:

a strategy storage module, configured to store the current PTZ position of the image collecting device; and a strategy comparison module, configured to compare the expected PTZ position of the image collecting device with the current PTZ position of the image collecting device, and control the image collecting device based on the comparison result.

7. A method for controlling an image collecting device to locate a target, comprising:

configuring, by a system configuration unit, system parameters according to different scenarios;

locating, by an acoustic sound source locating unit, a plurality of acoustic sound source positions based on a plurality of received acoustical signals;

comparing, by a voice recognition unit, the received acoustical signals with a plurality of stored acoustical signals to obtain a plurality of voice recognition results;

deciding, by an application layer strategy unit, an expected Pan-Tilt-Zoom (PTZ) position of the image collecting device based on the acoustic sound source positions, the voice recognition results, and the system parameters; and comparing, by an image collection control unit, the expected PTZ position of the image collecting device with a current PTZ position of the image collecting device, and controlling the image collecting device based on a comparison result.

8. The method according to claim 7, wherein the system parameters comprise one or more parameters selected from a group consisting of a parameter for determining whether the image collecting device is controlled manually or automatically, a parameter for determining whether to carry out an acoustic sound source location, a parameter for determining whether to carry out a voice recognition, priorities of stored acoustical signals, and priorities of sound intensities.

9. The method according to claim 7, wherein the stored acoustical signals are acoustical signals from a plurality of acoustic sound sources.

10. The method according to claim 7, wherein the comparing the expected PTZ position of the image collecting device with the current PTZ position of the image collecting device and controlling the image collecting device based on the comparison result further comprise:

maintaining a position of the image collecting device to be unchanged, if the expected PTZ position of the image collecting device is consistent with the current PTZ position of the image collecting device;

otherwise, updating the current PTZ position of the image collecting device to the expected PTZ position of the image collecting device, and positioning PTZ on the image collecting device based on the expected PTZ position of the image collecting device.

* * * * *